Feb. 18, 1936.  F. E. BIGGS  2,031,404
VENTILATOR
Filed Jan. 22, 1934
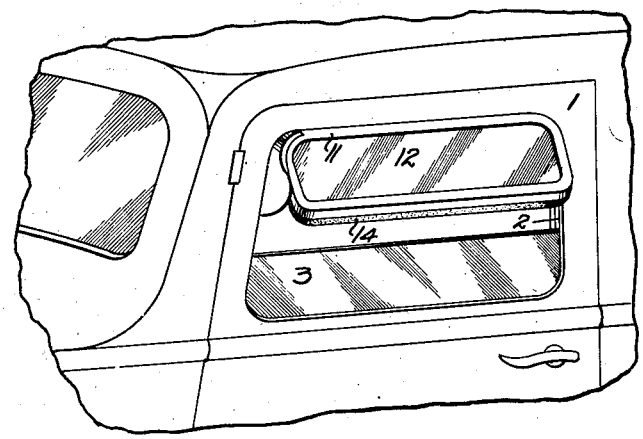
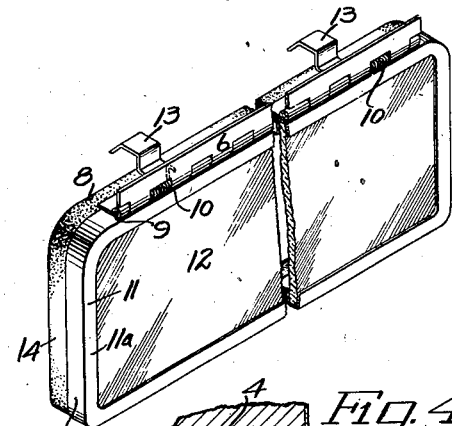
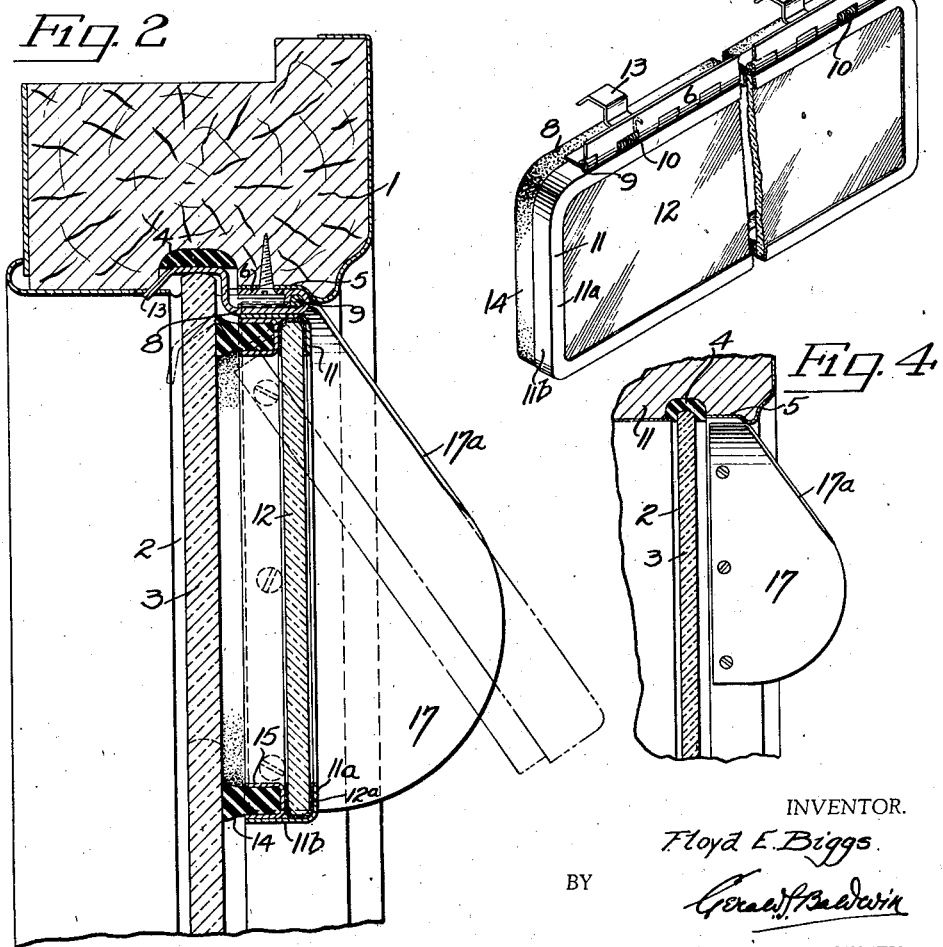
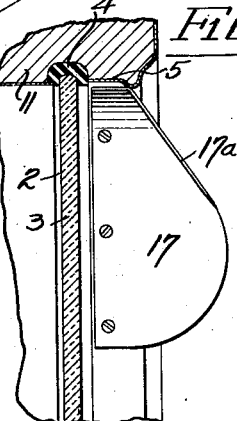
INVENTOR.
Floyd E. Biggs.
BY
ATTORNEY.

Patented Feb. 18, 1936

2,031,404

UNITED STATES PATENT OFFICE 2,031,404

VENTILATOR

Floyd E. Biggs, Detroit, Mich.

Application January 22, 1934, Serial No. 707,733

10 Claims. (Cl. 98—2)

This invention relates to improvements in ventilators, and refers primarily to ventilators intended for use on automobiles.

The invention aims, among other things, to provide a ventilator: which may be readily applied to all automobiles as now constructed without involving alterations thereto; whereby a flow of air through the window in conjunction with which it operates is permitted in sucn a manner that no perceptible draft is created; and whereby the passage of air through the window during rain or snow storms without danger of the moisture coming into the vehicle.

Another object of the invention is to provide a ventilator so arranged that it automatically opens when the window is lowered and closes automatically as the window is closed.

A further object of the invention is to provide a ventilator which, when closed, lies substantially parallel with and adjacent a portion of the window, so that an inwardly projecting resilient marginal portion of the ventilator makes an airtight joint against the portion of the window pane adjacent which it is disposed. Thus I aim to provide a dead air space between the window and the ventilator to prevent frosting of that portion of the glass during cold weather.

Yet another object of the invention is to provide such a ventilator having its shield made of tinted transparent material so that it may also function as an anti-glare shield.

Having thus briefly stated some of the major objects and advantages of the invention I will describe a preferred embodiment thereof with the aid of the accompanying drawing, in which:

Figure 1 illustrates a perspective view of a portion of an automobile with my ventilator mounted thereon.

Figure 2 is an enlarged sectional view showing the ventilator mounted in position, and indicating the position of the fixed lateral guard.

Figure 3 is a reduced perspective view of the ventilator, and

Figure 4 is a side view of the lateral guard mounted in position.

Referring to the drawing, I designates a window molding provided with a conventional groove 2 to receive a vertically slidable window pane 3; and 4 is the usual resilient pad provided in the upper horizontal portion of the groove 2 against which the upper edge of the pane 3 rests when the window is closed.

Secured to the downwardly disposed face 5 of the outer upper portion of the window molding I is the leg 6 of a hinge which is connected to its other leg 8 by a hinge pin 9. Arranged around the latter are springs 10 which tend to force the legs 6 and 8 apart. Secured to the leg 8, and in the present instance integral therewith, are fingers 13 which are substantially U-shaped intermediately of their length, and extending inwardly around the frame 11 is a resilient packing strip 14 preferably made of rubber.

In the construction now shown the frame 11 is of angle section, so that one flange 11a thereof projects inwardly to form a bearing for the outer marginal portion of a transparent shield 12, and resting against the inner periphery of the latter and upon the other flange 11b of the frame 11 is a channel-shaped retainer 15, which is preferably held in position upon the said flange 11b by a series of spot welds. The shield 12 is preferably made of tinted transparent material so that it also functions as an anti-glare device. The packing strip 14 is held in the channel-shaped retainer 15 preferably by flexing the inner margin of the latter against it. 12a denotes a U-shaped support, generally made of felt, to receive the annular margin of the shield 12 and protect it from coming directly into contact with either the frame 11 or the retainer 15.

Secured to the front vertical margin of the window molding 1 is a lateral guard 17 having its outer upper margin 17a folded to engage the upper lateral margin of the ventilator frame 11 and limit its outward movement.

From the foregoing it will be seen that when the window pane 3 is completely closed the U-shaped portions of the fingers 13 extend over the upper edge of the said pane and are held between the latter and the resilient pad 4. Then the frame is held substantially parallel with the pane 3 so that the resilient strip 14 bears against the said pane and maintains a substantially dead air space between the latter and the shield 12. As the pane 3 is lowered the springs 10 turn the hinge leg 8, and with it the frame 11, outwardly and upwardly.

This movement, however, is limited firstly by contact of the fingers 13 with the upper margin of the pane 3 as the latter is lowered, and subsequently by contact of the frame 11 with the flexed margin 17a of the lateral guard 17. When it is desired to permit passage of air through the window and at the same time to eliminate any perceptible draft it is of course understood that the window pane 3 should be only lowered to a slight extent so that its upper edge is located well above the lower margin of the frame 11. It will then be found that the lateral guard 17 prevents either rain or snow from entering through the window. Further due to the formation of the outer extremities of the fingers 13 the latter are engaged by the upper margin of the window pane 3 as the latter is raised so that by raising the window the ventilator is also returned to its closed position.

Thus it will be seen that I have provided a ventilator which may be readily mounted on any window frame; which, when the window adjacent which it is mounted is only slightly open, eliminates any perceptible draught, and keeps out both rain and snow; which, when closed, protects that portion of the window which it covers from frosting; and wherein the shield, when made of tinted glass, also functions as an anti-glare protector.

While in the foregong the preferred embodiment of the invention has been described and shown, it is understood that the construction is susceptible to such modifications and alterations as fall within the scope of the appended claims.

What I claim is:

1. An arrangement of the character described comprising a window molding, a window movable therein, a ventilator pivoted adjacent the window, and fingers on the ventilator coacting with one window margin for moving the ventilator pivotally as the window is moved, said fingers being held between said window margin and the molding when the window is closed.

2. An arrangement of the character described comprising a window molding having grooves therein, a window movable in said grooves, a ventilator frame pivoted adjacent the molding, a transparent shield mounted in the frame, and fingers on the frame cooperating with one window margin for moving the frame pivotally into a position substantially parallel with the window as the latter is closed, said fingers being firmly held between said window margin and the molding when the window is closed.

3. An arrangement of the character described comprising a window molding, a window mounted therein, a ventilator pivoted adjacent said window, a transparent shield in said ventilator, a resilient strip arranged around said ventilator adapted to bear against the window and inclose an air space between the latter and the shield, and means on said ventilator engaging the window when the latter is closed to hold said ventilator immovable and retain the resilient strip against the window and thus maintain the dead air space.

4. An arrangement of the character described comprising a window molding, a window movable therein, a ventilator pivoted adjacent said window, means on the ventilator coacting with the window for moving the ventilator into a position substantially parallel with the window as the latter is closed, and other means adapted to move the ventilator pivotally from the window as the latter is opened.

5. An arrangement of the character described comprising a window molding, a window movable therein, a ventilator frame pivoted adjacent said window, a transparent shield in said frame, means on said frame cooperating with the window for moving the frame into a position substantially parallel with the window as the latter is closed, other means adapted to move the ventilator pivotally from the window as the latter is opened, and a guard fixed adjacent the window to limit the pivotal movement of the frame from the window.

6. An arrangement of the character described comprising a window molding, a window slidable therein, a hinge mounted adjacent the window, a ventilator supported by said hinge, a tinted transparent shield in the frame, means on the frame actuated by movement of the window for moving the frame pivotally towards the window, springs for moving the frame from the window, and a guard to limit the pivotal movement of the frame from the window.

7. An arrangement of the character described comprising a window molding, a window slidable therein, a ventilator pivoted adjacent said window, means on said ventilator coacting with the window for moving the ventilator pivotally, a guard fixed adjacent one lateral margin of the ventilator to prevent the passage of air between the molding and the ventilator, and means on the guard for limiting the pivotal movement of the ventilator.

8. An arrangement of the character described comprising a window molding, a window slidable therein, a ventilator pivoted adjacent said window, fingers extending from said ventilator projecting over the upper margin of the window so that the ventilator is moved pivotally in one direction as the window is raised, and spring means tending to move the ventilator pivotally in the other direction.

9. An arrangement of the character described comprising a window molding, a window movable therein, a ventilator having a transparent shield therein pivoted adjacent said window, an annular resilient strip projecting from the ventilator, fingers on the ventilator engaging one margin of the window as the latter is being closed and held immovable, when said window is closed, between said window margin and the molding to retain the annular strip against the window and inclose a dead air space between the latter and the ventilator, and means for moving the ventilator pivotally from the window as the latter is opened.

10. An arrangement of the character described comprising a window frame, a window pane slidably mounted therein, a ventilator frame pivoted on the window frame to prevent direct passage of air through the window when the latter is open, means for automatically opening and closing the ventilator when the window is opened and closed, said ventilator having a transparent shield therein, and a continuous resilient strip projecting from said ventilator adapted to bear against the window pane and enclose an air space between the latter and the shield.

FLOYD E. BIGGS.